United States Patent
Chung et al.

(10) Patent No.: US 10,823,956 B2
(45) Date of Patent: Nov. 3, 2020

(54) DEVICE AND METHOD FOR CLEANING CAMERA LENS PART

(71) Applicant: MYONGJI UNIVERSITY INDUSTRY AND ACADEMIA COOPERATION FOUNDATION, Gyeonggi-do (KR)

(72) Inventors: Sang Kug Chung, Yongin-si (KR); Kang Yong Lee, Goyang-si (KR)

(73) Assignee: MYONGJI UNIVERSITY INDUSTRY AND ACADEMIA COOPERATION FOUNDATION, Yongin-si (KR)

( * ) Notice: Subject to any disclaimer, the term of this patent is extended or adjusted under 35 U.S.C. 154(b) by 251 days.

(21) Appl. No.: 15/781,513

(22) PCT Filed: Dec. 7, 2016

(86) PCT No.: PCT/KR2016/014260
§ 371 (c)(1),
(2) Date: Jun. 5, 2018

(87) PCT Pub. No.: WO2017/099459
PCT Pub. Date: Jun. 15, 2017

(65) Prior Publication Data
US 2018/0275397 A1 Sep. 27, 2018

(30) Foreign Application Priority Data
Dec. 7, 2015 (KR) .......... 10-2015-0173015

(51) Int. Cl.
*G02B 27/00* (2006.01)
*G03B 5/00* (2006.01)

(52) U.S. Cl.
CPC .......... *G02B 27/0006* (2013.01); *G03B 5/00* (2013.01); *G03B 2205/00* (2013.01); *G03B 2205/0069* (2013.01)

(58) Field of Classification Search
None
See application file for complete search history.

(56) References Cited

U.S. PATENT DOCUMENTS

| 2004/0211659 A1 | 10/2004 | Velev |
| 2006/0193058 A1* | 8/2006 | Ootsuka ................ G03B 5/00 359/665 |

(Continued)

FOREIGN PATENT DOCUMENTS

| JP | 2007082062 A | 3/2007 |
| JP | 2010107908 A | 5/2010 |

(Continued)

OTHER PUBLICATIONS

Hal R. Holmes and Karl F. Böhringer, Transporting droplets through surface anisotropy, Microsystems & Nanoengineering (2015) 1, 15022; doi:10.1038/micronano.2015.22; Published online: Sep. 28, 2015.

(Continued)

*Primary Examiner* — Jennifer D. Carruth

(57) ABSTRACT

The present invention relates to a device and methods for cleaning a camera lens unit. In an embodiment of the present invention, the lens unit cleaning device includes: a cover glass (substrate), a plurality of electrodes successively arranged on the upper surface of the cover glass, a dielectric layer laminated on the upper surface of the electrode, and a hydrophobic layer laminated on the dielectric layer and having droplets formed on the surface. As different DC voltages are applied to a plurality of electrodes, the droplets move outward from the center of the cover glass.

12 Claims, 4 Drawing Sheets

(56) References Cited

U.S. PATENT DOCUMENTS

| | | | |
|---|---|---|---|
| 2009/0130447 A1* | 5/2009 | Potter | G02B 27/0006 |
| | | | 428/408 |
| 2011/0005931 A1* | 1/2011 | Zhe | B81C 99/002 |
| | | | 204/451 |
| 2012/0243093 A1 | 9/2012 | Tonar et al. | |
| 2015/0008123 A1* | 1/2015 | Cheng | B03C 5/02 |
| | | | 204/450 |
| 2016/0305906 A1* | 10/2016 | Amos | B01L 7/52 |
| 2018/0264526 A1* | 9/2018 | Kim | B08B 3/12 |
| 2019/0227198 A1* | 7/2019 | Jin | G02B 27/0006 |

FOREIGN PATENT DOCUMENTS

| | | |
|---|---|---|
| JP | 2013080177 A | 5/2013 |
| KR | 20130130826 A | 12/2013 |

OTHER PUBLICATIONS

International Search Report of PCT/KR2016/014260, dated Jan. 20, 2017.
Torkkeli, Altti Droplet microfluidics on a planar surface. Espoo 2003. VTT Publications 504. 194 p. + app. 19 p.

* cited by examiner

[Figure 1]
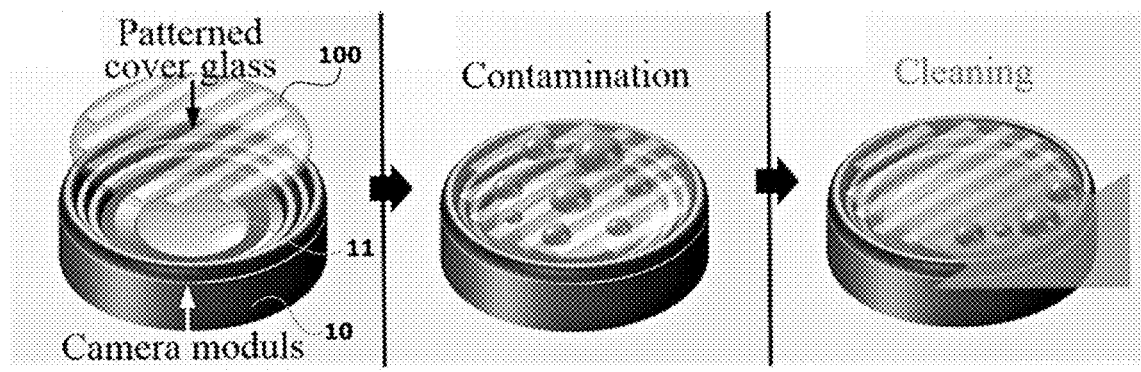
[Figure 2]
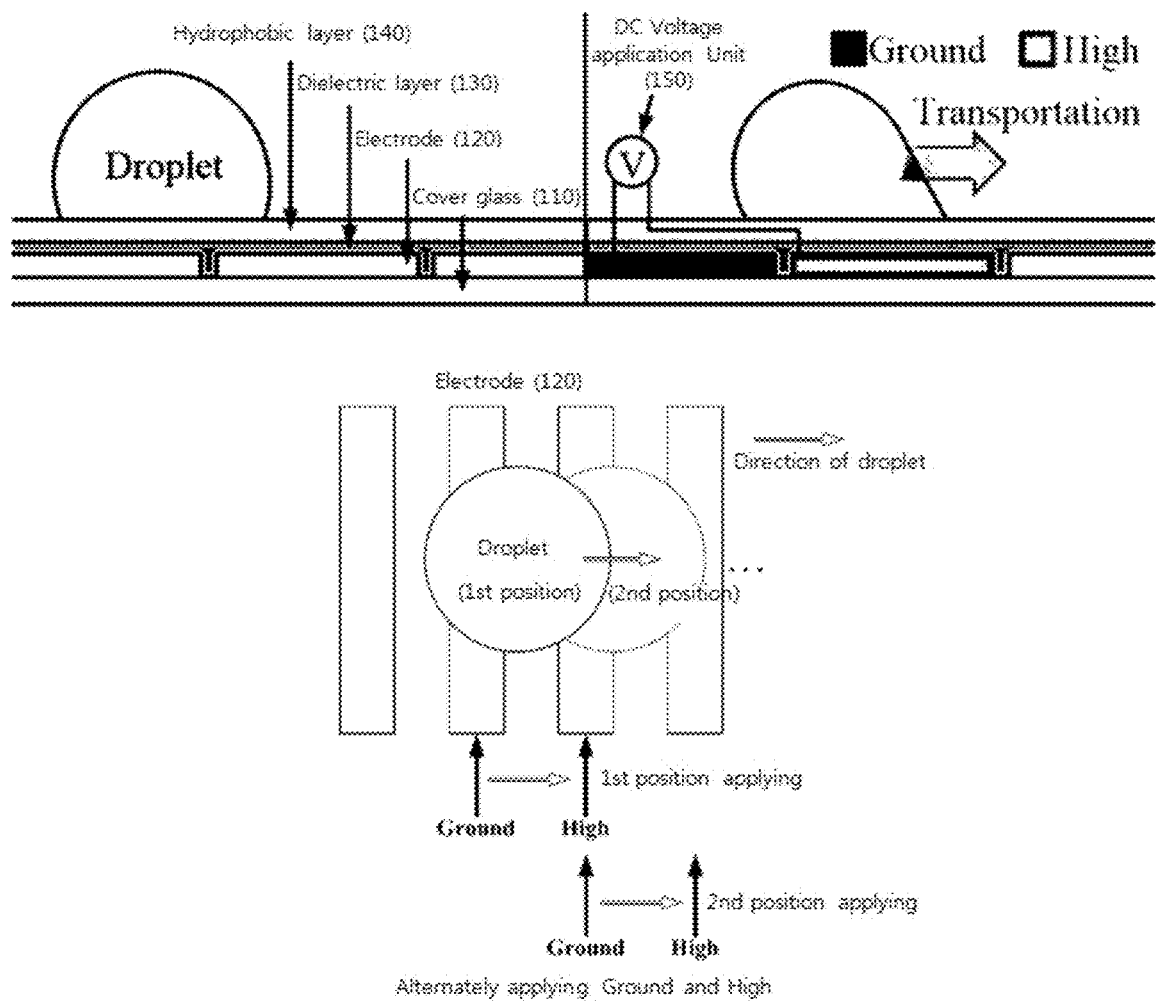

[Figure 3]
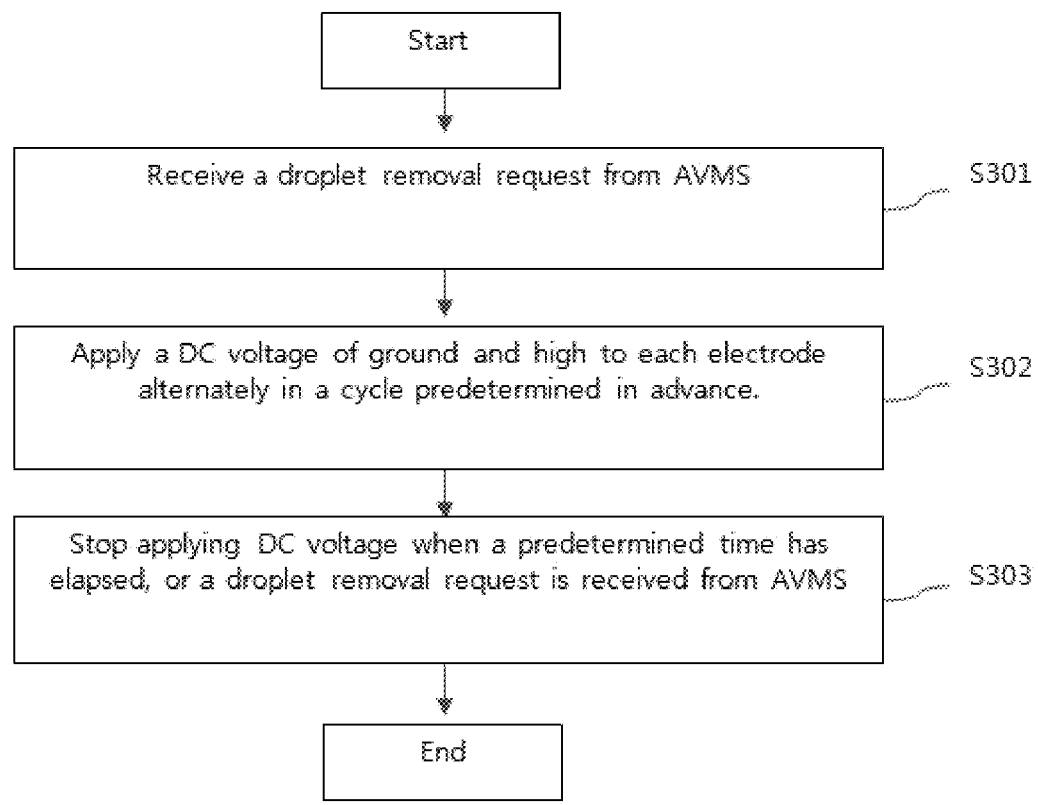

[Figure 4]
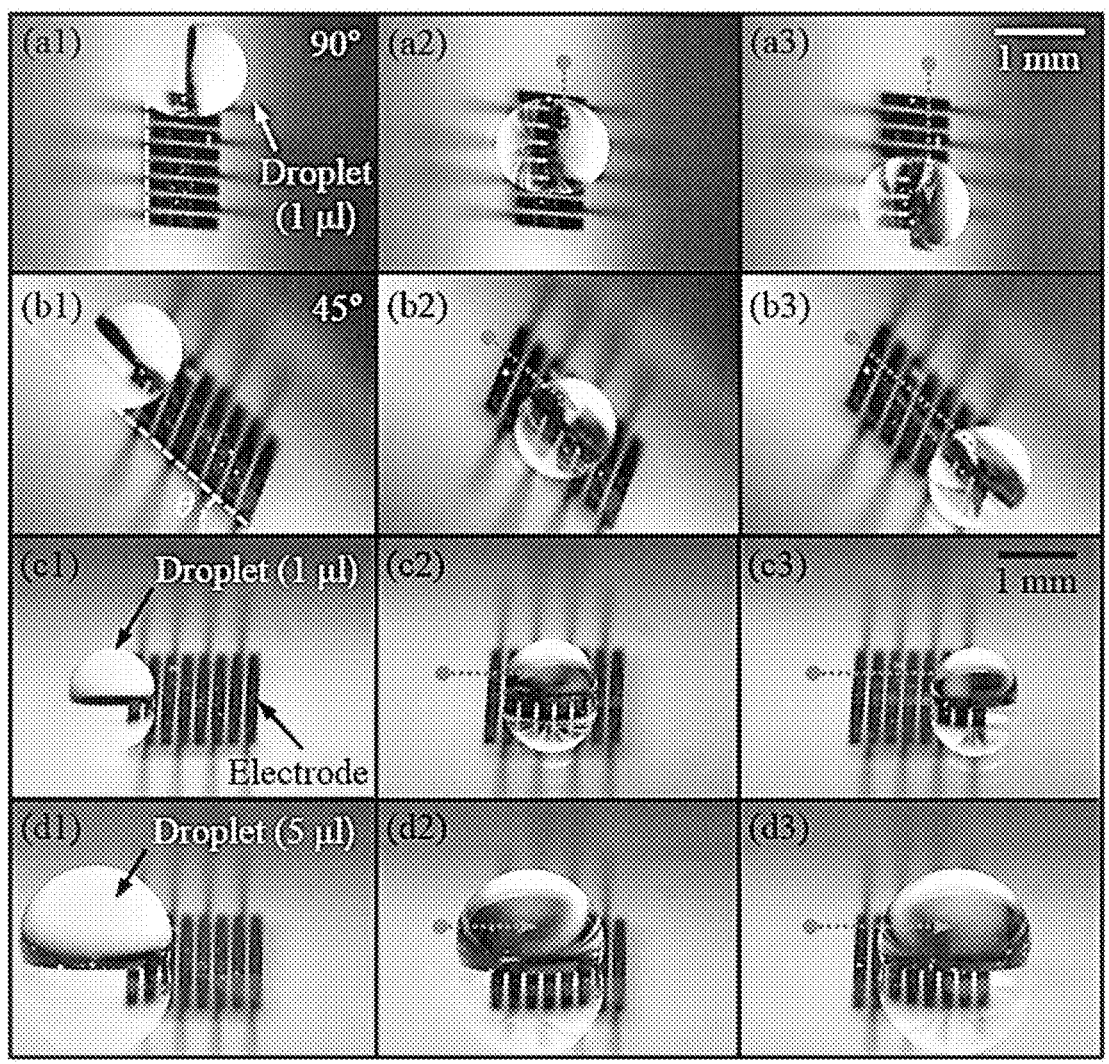

[Figure 5]
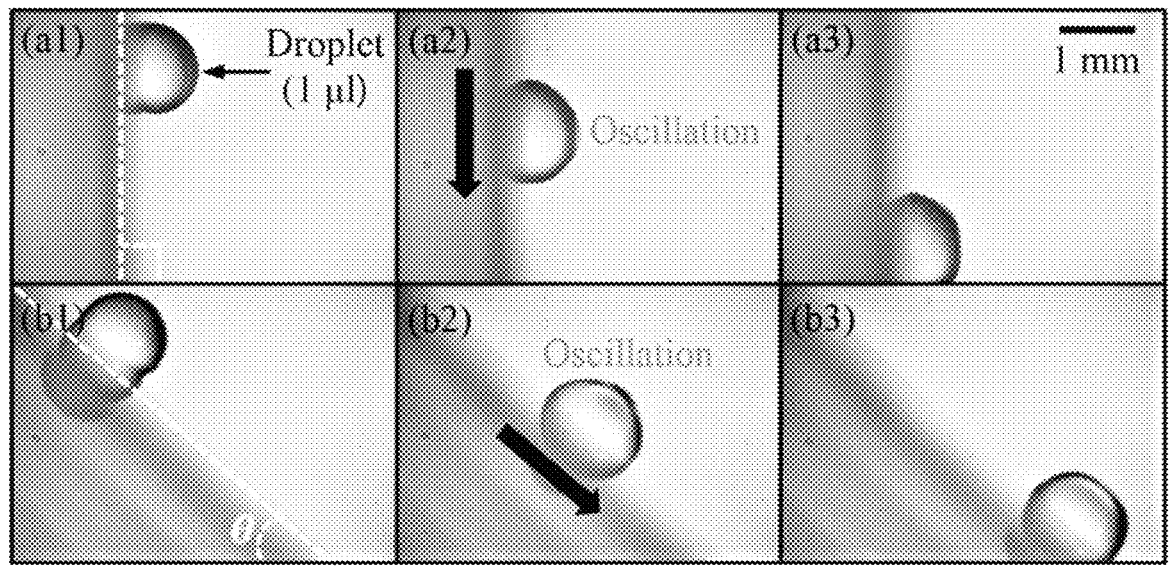
[Figure 6]
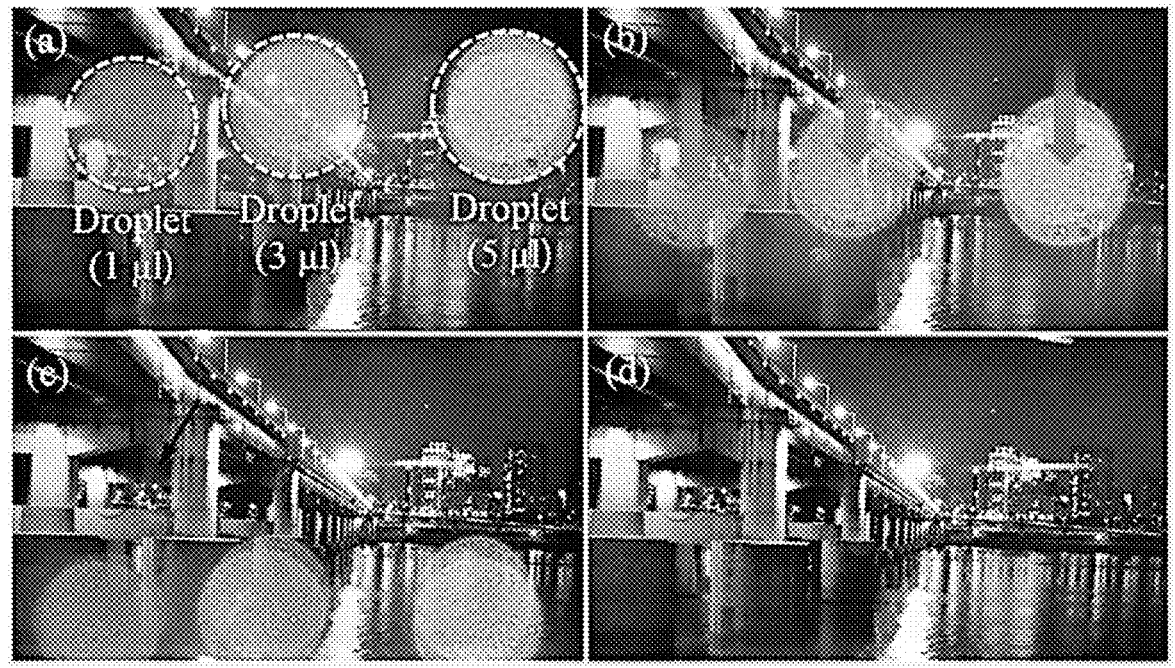

DEVICE AND METHOD FOR CLEANING CAMERA LENS PART

The present invention relates to a device and methods for cleaning a camera lens unit, and more particularly, to a technique for removing droplets formed on the surface of a lens unit of a miniature camera.

BACKGROUND ART

The miniature camera is currently used in various industrial fields such as automobiles, unmanned aerial vehicles (drone) as well as information and communication devices such as smart phones and pads.

Especially, in the future automobile industry, cameras that can play the role of 'eyes' of automobiles along with the spread of smart cars and automobile electrical parts are emerging as key parts of the car.

However, when miniature cameras are used in humid conditions with rain or mist, droplets generated on the lens surface of the camera may degrade the camera's performance and cause errors in the image-based automotive electrical system.

This can threaten the safety of the driver during driving and can also cause a big car accident.

Therefore, a miniature camera used in industries such as automobiles and unmanned aerial vehicles needs a technique to remove droplets on the surface of a lens.

Accordingly, a method of cleaning automobile camera lens by spraying compressed air onto the lens has been proposed. However, there is a problem that it is difficult to downsize the camera due to mechanical devices such as a nozzle for injecting compressed air and an air supply means for supplying air to the nozzle, lowering the applicability to various camera modules for vehicles.

DETAILED DESCRIPTION OF THE INVENTION

Technical Problem

The present invention has been made to solve the above-mentioned problems occurring in the prior art, and intends to provide a method for removing droplets formed on the surface of a lens portion of a miniature camera

Solutions to Problem

To achieve the above object, the device for cleaning the camera lens unit according to one embodiment of the present invention includes: a cover glass (substrate), a plurality of electrodes successively arranged on the upper surface of the cover glass, a dielectric layer laminated on the upper surface of the electrode, and a hydrophobic layer laminated on the dielectric layer and having droplets formed on the surface. As different DC voltages are applied to a plurality of electrodes, the droplets move outward from the center of the cover glass.

To achieve the above object, the device for cleaning the camera lens unit according to another embodiment of the present invention includes: a cover glass (substrate), a plurality of electrodes successively arranged on the upper surface of the cover glass, a dielectric layer laminated on the upper surface of the electrode, and a hydrophobic layer laminated on the dielectric layer and having droplets formed on the surface thereof. As the AC voltage is applied to the electrodes, the droplets move outward from the center of the cover glass.

To achieve the above object, the device for cleaning the camera lens unit according to an embodiment of the present invention includes: a cover glass (substrate), a plurality of electrodes successively arranged on the upper surface of the cover glass, a dielectric layer laminated on the upper surface of the electrode, a hydrophobic layer laminated on the dielectric layer and having droplets formed on the surface thereof, and a DC voltage applying unit for applying a DC voltage to each of the electrodes. The steps for cleaning the camera lens unit include: receiving a droplet removal request signal; sequentially alternating a ground voltage and a high voltage, which are DC voltages, to each electrode in a predetermined cycle according to the received droplet removal request signal; and stopping the application of the DC voltage when a predetermined time has elapsed or a droplet removal request cancellation signal is received. While different DC voltages are applied to a plurality of electrodes among the aforesaid electrodes, the droplet moves outward from the center of the cover glass.

To achieve the above object, the device for cleaning the camera lens unit according to another embodiment of the present invention includes: a cover glass (substrate), a plurality of electrodes successively arranged on the upper surface of the cover glass, a droplet stacked on the upper surface of the electrode, a dielectric layer laminated on the upper surface of the electrode, a hydrophobic layer laminated on the dielectric layer and having droplets formed on the surface thereof, and an AC voltage applying unit for applying an AC voltage to the electrode. The steps for cleaning the camera lens unit include: receiving a droplet removal request signal; applying an AC voltage to the electrode in response to the received droplet removal request signal; and stopping the application of the AC voltage when a predetermined time has elapsed, or a droplet removal request cancellation signal is received. While AC voltages are applied to the electrodes, the droplet moves outward from the center of the cover glass.

According to an embodiment of the present invention, this device is easy to downsize, compared to a mechanically driven cleaning device, and the present invention can be applied to camera modules for various purposes.

In addition, when a droplet is formed on the lens portion of a miniature camera installed in a car or a camera installed in an unmanned airplane (drone), so a person cannot reach the portion by hand during operation, the droplet can be automatically removed, and a clear image can be obtained at all times.

BRIEF DESCRIPTION OF DRAWINGS

FIG. 1 shows a configuration of an apparatus for cleaning the lens unit of a camera according to an embodiment of the present invention.

FIG. 2 shows a configuration of the lens unit cleaning device according to an embodiment of the present invention.

FIG. 3 is a flowchart illustrating a lens portion cleaning process according to an embodiment of the present invention.

FIG. 4 shows an actual cleaning process of the lens unit cleaning device according to an embodiment of the present invention.

FIG. 5 shows an actual cleaning process of the lens unit cleaning device according to an embodiment of the present invention.

FIG. 6 is an actual use of the lens unit cleaning device according to an embodiment of the present invention.

MODES FOR CARRYING OUT THE INVENTION

Hereinafter, the present invention will be described with reference to the accompanying drawings. The present invention may, however, be embodied in many different forms and should not be construed as limited to the embodiments set forth herein. In order to clearly illustrate the present invention, parts not related to the description are omitted, and parts similar throughout the specification are labeled with similar reference numerals.

Throughout the specification, when a part is referred to as being "connected" to another part, it is not limited to the case where it is "directly connected" but also includes the case where it is "indirectly connected" with another member in the middle thereof.

Also, when an element is referred to as "comprising", it means that it can include other elements, not excluding other elements unless specifically stated otherwise.

Hereinafter, embodiments of the present invention will be described in detail with reference to the accompanying drawings.

FIG. 1 shows a configuration of the apparatus for cleaning the lens unit of a camera, according to an embodiment of the present invention.

The device for cleaning the lens unit of a camera (hereinafter referred to as 'lens unit cleaning device') (100) according to an embodiment of the present invention may be coupled to the lens unit (10) of a camera as shown in FIG. 1 and can protect the camera lens (11) from external contamination and impact.

The lens unit cleaning device (100 has a plurality of electrodes, separated from each other, patterned on the microchip fabricated by a MEMS process.

In an embodiment of cleaning the lens unit (10), the lens unit cleaning device (100) can change the surface tension of the droplet by applying a DC voltage to each electrode.

According to an embodiment, a ground voltage may be applied to one electrode and a high voltage, e.g., a positive voltage, may be applied to another electrode.

In this case, as shown in FIG. 1, the droplet moves from the electrode to which the ground voltage is applied towards the electrode to which the high voltage is applied (eventually to the outside of the lens unit (10)).

In another embodiment of cleaning the lens unit (10), the lens unit cleaning device (100) may apply a low-frequency AC voltage to the electrode to vibrate the droplet, change the surface tension of the droplet, and remove the droplet.

If the photographing line of the lens unit (10) has a predetermined inclination with respect to the plane, the droplet vibrates and moves downward (eventually to the outside of the lens unit (10)).

Hereinafter, the configuration of the lens unit cleaning device (100) will be described with reference to FIG. 2.

FIG. 2 shows a configuration of the lens unit cleaning device according to an embodiment of the present invention.

The lens unit cleaning device (100) may include a cover glass (substrate) (110), electrodes (120), a dielectric layer (130), a hydrophobic layer (140), and a DC voltage applying unit (150).

The cover glass (110) functions as a substrate of the lens unit cleaning device (100), as the lowest layer of the lens unit cleaning device (100) and can protect the camera lens (11) from external contamination and impact.

On the other hand, the electrodes (120) are transparent and may be continuously arranged on the upper surface of the cover glass (110) to form a specific pattern.

Here, the electrodes (120) may have a linear, streamlined, or an annular shape, and the shape of the pattern formed by a plurality of electrodes (120) is not limited.

On the other hand, the dielectric layer (130) may be laminated to the upper surface of the electrodes (120), as shown in FIG. 2 to fill the space between the electrodes (120).

For reference, the dielectric layer (130) may comprise at least one material selected from the group consisting of parylene C, teflon, and metal oxide film.

On the other hand, the hydrophobic layer (140) is the uppermost layer of the lens unit cleaning device (100), has droplets formed on the surface thereof, and may be formed of a material having a low affinity with a fluid such as water.

Accordingly, the droplet can easily move on the surface of the hydrophobic layer (140).

On the other hand, the DC voltage applying unit (150) can alternately apply the ground voltage and the high voltage, which are DC voltages, to the electrodes (120) in a predetermined cycle.

At this time, on the surface of the hydrophobic layer (140), the droplet moves from the electrode to which the ground voltage is applied towards the electrode to which the high voltage is applied, and eventually moves to the outermost side of the hydrophobic layer (140) to clean the lens unit (10).

In another embodiment of the lens unit cleaning device (100), the lens unit cleaning device (100) includes: a cover glass (110), electrodes (120), a dielectric layer (130), a hydrophobic layer (140), and an AC voltage application unit (not shown).

That is, in another embodiment of the lens unit cleaning device (100), the cover glass (110), the electrodes (120), the dielectric layer (130), and the hydrophobic layer (140) are all the same, and the DC voltage applying unit (150) is replaced with the AC voltage application unit (not shown).

Here, the photographing line of the lens unit (10) may have a predetermined inclination with respect to the plane.

The AC voltage application unit (not shown) may apply an AC voltage to the electrode (120), and droplets formed on the surface of the hydrophobic layer (140) may be vibrated when an AC voltage is applied to the electrode (120).

At this time, due to the inclination of the lens unit (10), the droplet moves to the outside of the hydrophobic layer (140) along the inclination, thereby cleaning the lens unit (10).

In another embodiment of the lens unit cleaning device (100), the lens unit cleaning device (100) includes: a cover glass (110), electrodes (120), a dielectric layer (130), a hydrophobic layer (140), a DC voltage application unit (150), an AC voltage application unit (not shown), and a voltage mode selector (not shown).

That is, in the lens unit cleaning device (100) according to another embodiment, a cover glass (110), electrodes (120), a dielectric layer (130), a hydrophobic layer (140), a DC voltage applying unit (150), and an AC voltage applying unit (not shown) are all the same, and a voltage mode selection unit (not shown) is added.

The voltage mode selection unit (not shown) may apply a voltage to the electrodes (120) using either the DC voltage application unit (150) or the AC voltage application unit (not shown) depending on the user's choice whether to apply DC voltage or AC voltage to the electrodes (120) to remove the droplets according to the environment in which the camera (not shown) is installed.

FIG. 3 is a flowchart illustrating a lens portion cleaning process according to an embodiment of the present invention.

FIG. 3 shows the lens unit cleaning device (100) coupled to the camera module (not shown) (e.g., AVMS; Around View Monitoring System) of the vehicle, and hereinafter, the flow chart of FIG. 3 will be described with the lens unit cleaning device (100) shown in FIG. 2 as a main body.

The lens unit cleaning device (100) receives the droplet removal request signal from the AVMS to which the driver's request is input (S301).

After S301, the lens unit cleaning device (100) alternately applies ground and high voltages, which are DC voltages, to each electrode (120) in a predetermined cycle according to the received droplet removal request signal (S302).

At this time, the droplets formed on the surface of the hydrophobic layer (140) move to the outside of the hydrophobic layer (140) by alternating ground and high voltages applied to each electrode (120), cleaning the lens unit (10).

According to another embodiment, when AC voltage is applied to the electrodes (120) in S302, the droplets formed on the surface of the hydrophobic layer (140) vibrate due to the application of the AC voltage and move to the outside of the hydrophobic layer (140) along the inclination of the lens unit (10), cleaning the lens unit (10).

On the other hand, although not mentioned above, the DC voltage or the AC voltage may be supplied from the power source of the camera.

After S302, if a predetermined time elapses or a droplet removal request cancellation signal is received from the AVMS, the lens unit cleaning device (100) stops applying the DC voltage to each electrode (S303).

FIG. 4 shows an actual cleaning process of the lens unit cleaning device according to an embodiment of the present invention.

The lens unit cleaning device (100) shown in FIG. 4 is a case in which a ground voltage and a high voltage, which are DC voltages, are alternately applied to each electrode (120) at a predetermined cycle. The FIG. 4 shows the results of the tests conducted by installation slope (90° and 45°) of the lens unit cleaning device (100) and the droplet size (1μℓ and 5μℓ).

FIGS. 4(a1) to (a3) show a case where the installation slope of the lens unit cleaning device (100) is 90° and the size of the droplets is 1μℓ. The droplets move downward when a ground voltage and a high voltage, which are DC voltages, are sequentially alternately applied to each electrode (120) at predetermined time intervals.

FIG. 4(b1) to (b3) show a case where the installation slope of the lens unit cleaning device (100) is 45° and the size of the droplets is 1μℓ. The droplets move downward when a ground voltage and a high voltage, which are DC voltages, are sequentially alternately applied to each electrode (120) at predetermined time intervals.

FIG. 4(c1) to (c3) show a case where the installation slope of the lens unit cleaning device (100) is zero and the size of the droplets is 1μℓ. When a ground voltage and a high voltage, which are DC voltages, are sequentially alternately applied to each electrode (120) at predetermined time intervals, the droplets move to the right, that is, from the electrode to which the ground voltage is applied towards the electrode to which the high voltage is applied.

FIG. 4(d1) to (d3) show a case where the installation slope of the lens unit cleaning device (100) is zero and the size of the droplets is 5μℓ. When a ground voltage and a high voltage, which are DC voltages, are sequentially alternately applied to each electrode (120) at predetermined time intervals, the droplets move to the right, that is, from the electrode to which the ground voltage is applied towards the electrode to which the high voltage is applied.

FIG. 4 shows that the lens unit cleaning device (100) can clean the lens unit even at various installation slopes and droplet sizes.

FIG. 5 shows an actual cleaning process of the lens unit cleaning device according to an embodiment of the present invention.

The lens unit cleaning device (100) shown in FIG. 5 is a case in which an AC voltage is applied to each electrode (120). The FIG. 5 shows the results of the tests conducted by installation slope (90° and 45°) of the lens unit cleaning device (100) with a droplet size of 1ℓ.

FIGS. 5(a1) to (a3) show a case where the installation slope of the lens unit cleaning device (100) is 90° and the size of the droplets is 1μℓ. When an AC voltage is applied to the electrode (120), the droplets vibrate and move downward along the installation slope.

FIG. 5(b1) to (b3) show a case where the installation slope of the lens unit cleaning device (100) is 45° and the size of the droplets is 1μℓ. When an AC voltage is applied to the electrode (120), the droplets vibrate and move downward along the installation slope.

FIG. 6 shows an actual cleaning process of the lens unit cleaning device according to an embodiment of the present invention.

The installation slope of the lens unit cleaning device (100) is 90°, and the droplets having a size of 1μℓ, 3μℓ, and 5μℓ are formed on the surface of the hydrophobic layer (140).

For reference, a plurality of electrodes (120) are transparent and not exposed on the screen of the camera module (not shown).

In the state (a), when a ground voltage and a high voltage, which are DC voltages, are alternately applied to each electrode (120) in a predetermined cycle, or when an AC voltage is applied to the electrodes (120), each droplet moves downward as shown in (b) and (c), and finally the lens unit can be cleaned as shown in (d) to provide a clean image.

INDUSTRIAL APPLICABILITY

The scope of the present invention is represented by the claims to be described later, and all changes or modifications derived from the meaning and scope of the claims and their equivalents should be construed as being included in the scope of the present invention.

The invention claimed is:

1. A device for cleaning a lens unit of a camera comprising:
   a cover glass;
   a plurality of electrodes successively arranged on an upper surface of the cover glass;
   a dielectric layer laminated on an upper surface of the plurality of electrodes; and
   a hydrophobic layer laminated on the dielectric layer and having droplets formed on a surface,
   wherein the droplets move outward from a center of the cover glass by applying different DC voltages to the plurality of electrodes.

2. The device of claim 1, further comprising:
   a DC voltage applying unit configured to sequentially alternately apply a ground voltage and a high voltage, which are DC voltages, to the plurality of electrodes at predetermined intervals.

3. The device of claim 1,
wherein the electrodes have a linear, streamlined or annular shape.

4. The device of claim 1,
wherein the droplets move from the electrodes to which a ground voltage is applied toward the electrodes to which a high voltage is applied.

5. A device for cleaning a lens unit of a camera comprising:
a cover glass;
a plurality of electrodes successively arranged on an upper surface of the cover glass;
a dielectric layer laminated on an upper surface of the electrodes; and
a hydrophobic layer laminated on the dielectric layer and having droplets formed on a surface,
wherein the droplets move outward from a center of the cover glass by applying an AC voltage to the electrodes.

6. The device of claim 5, further comprising:
an AC voltage applying unit for applying the AC voltage to the electrodes.

7. The device of claim 5,
wherein the electrodes have a linear, streamlined or annular shape.

8. The device of claim 5,
wherein
the lens unit has a predetermined slope with respect to a plane of a photographing line; and
the droplets move to outside of the hydrophobic layer by inclination during a vibration by applying the AC voltage.

9. A method for cleaning a lens unit of a camera comprising:
receiving a droplet removal request signal;
sequentially alternating a ground voltage and a high voltage, which are DC voltages, to a plurality of electrodes in a predetermined cycle according to the received droplet removal request signal; and
stopping the application of the DC voltages when a predetermined time has elapsed, or a droplet removal request cancellation signal is received,
wherein the plurality of electrodes are successively arranged on an upper surface of a cover glass, a dielectric layer is laminated on an upper surface of the electrodes, a hydrophobic layer is laminated on the dielectric layer and having droplets formed on a surface thereof, and a DC voltage applying unit applies the DC voltages to the electrodes,
wherein the droplets move outward from a center of the cover glass by applying different DC voltages to the electrodes.

10. The method of claim 9,
wherein
the droplets move from the electrodes to which the ground voltage is applied towards the electrodes to which the high voltage is applied.

11. A method for cleaning a lens of a camera comprising:
receiving a droplet removal request signal,
applying an AC voltage to electrodes in response to the received droplet removal request signal; and
stopping the application of the AC voltage when a predetermined time has elapsed, or a droplet removal request cancellation signal is received,
wherein the electrodes are successively arranged on an upper surface of a cover glass, a dielectric layer is laminated on an upper surface of the electrodes, a hydrophobic layer is laminated on the dielectric layer and having droplets formed on a surface thereof, and an AC voltage applying unit applies the AC voltage to the electrodes,
wherein the droplets move outward from a center of the cover glass by applying the AC voltage to the electrodes.

12. The method of claim 11,
wherein the lens has a predetermined slope with respect to a plane of a photographing and the droplets move to outside of the hydrophobic layer due to inclination during a vibration by applying the AC voltage.

* * * * *